Aug. 21, 1923.
D. BRANDRIFF
1,465,540
CONTROL VALVE MECHANISM
Filed July 21, 1920
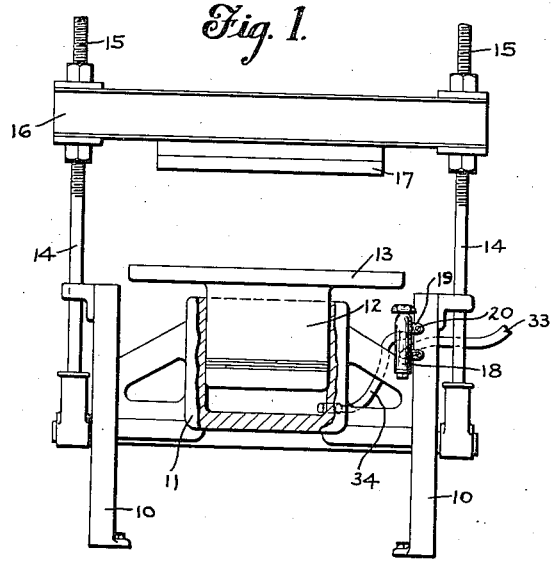
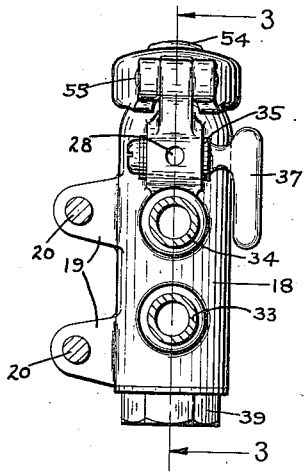
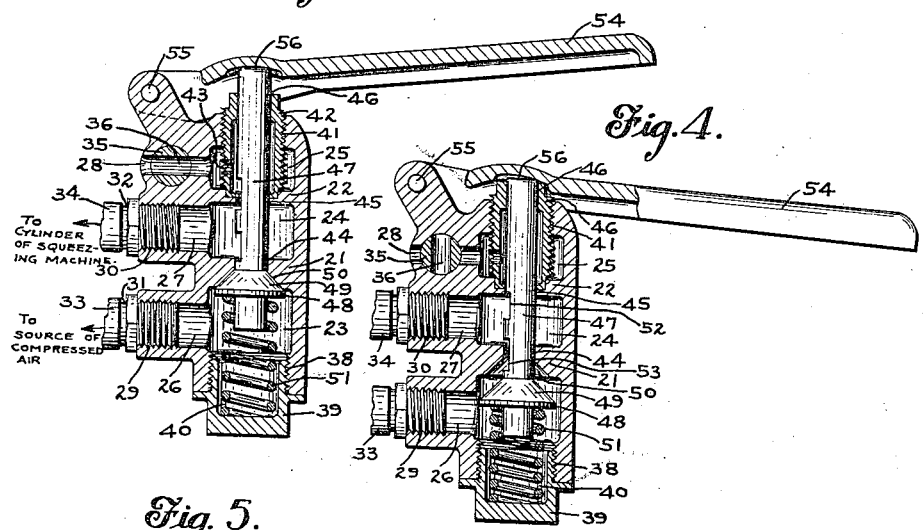
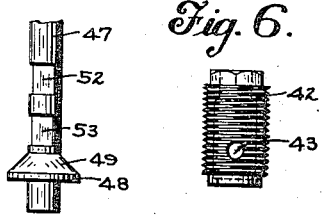
Inventor
Daniel Brandriff
By Henry E. Rockwell
Attorney Patented Aug. 21, 1923.

1,465,540

UNITED STATES PATENT OFFICE.

DANIEL BRANDRIFF, OF SHORT BEACH, BRANFORD, CONNECTICUT, ASSIGNOR TO MALLEABLE IRON FITTINGS COMPANY, OF BRANFORD, CONNECTICUT.

CONTROL-VALVE MECHANISM.

Application filed July 21, 1920. Serial No. 397,961.

*To all whom it may concern:*

Be it known that I, DANIEL BRANDRIFF, a citizen of the United States, residing at Short Beach, town of Branford, county of New Haven and State of Connecticut, have invented certain new and useful Improvements in Control Valve Mechanisms, of which the following is a full, clear, and exact description.

This invention relates to controlling valves and particularly to valves for controlling the supply of air to, and the venting of air from, the cylinders of air operated devices such as lift machines, jolt and squeezing machines, presses and the like.

One object of my invention is to provide a new and improved controlling valve.

Another object of my invention is to provide a controlling valve which will be positive in its operation and yet not require an excessive amount of effort on the part of the operator.

Still another object of my invention is to provide a valve by which the venting of the air from the working chamber may be controlled as desired.

To these and other ends, the invention resides in certain novel features and combination of parts to be hereinafter described and claimed.

In the accompanying drawings:

Fig. 1 is a front elevational view of an air squeezer, to which my invention is applied.

Fig. 2 is a rear elevational view of my improved controlling valve.

Fig. 3 is a sectional view on line 3—3 of Fig. 2.

Fig. 4 is a view similar to Fig. 3, but showing the valve in a different position.

Fig. 5 is a detail view of the main valve and valve stem.

Fig. 6 is a detail view of a bushing surrounding the valve stem.

While I have chosen to illustrate, in the accompanying drawings one embodiment of my invention as applied to an air squeezer, it will be understood, that the invention is in no way limited to the exact form shown, and is capable of use in connection with many other machines which employ, or are operated by, air under pressure or under exhaust tension.

The air squeezer is shown more or less diagrammatically in Fig. 1 and comprises base standards 10 which constitute the support of the operating parts of the squeezer including a cylinder 11 in which reciprocates a piston 12 carrying a supporting table 13 of the usual construction. On the standards 10, are supported two rods 14, one at each end of the machine, which, in turn, support adjustably on their threaded upper ends 15, a beam 16, which carries an abutment 17, opposing the supporting table 13. The parts just described are of the usual construction and form no part of the present invention.

Mounted on one of the standards 10, is the casting 18, of my improved controlling valve. The casting is provided with two lugs 19, through which are passed screws or bolts 20 to secure the casting to the standard. The interior of this casting is divided by two partitions 21 and 22 into three chambers 23, 24, and 25 as shown in Figures 3 and 4, and communicating ducts 26, 27, 28 are provided, leading into the three chambers, respectively, from the exterior of the casting.

The ducts 26 and 27 are interiorly threaded at their outer ends 29 and 30, and threaded nipples 31 and 32 are inserted therein. Attached to these nipples are, in the embodiment shown, two flexible tubes 33 and 34, the former communicating with a source of compressed air and the latter with the cylinder 11. Mounted across the duct 28 to control the same is a rotary valve 35 having a valve port 36, and a wing 37, by which it may be grasped by the fingers and turned to allow the chamber 25 to communicate with the atmosphere, and thereby vent this chamber. In Fig. 4 this valve is shown in closed position and in Fig. 3, it is shown in fully opened position. It may, of course, be rotated to any point between these two extremes and thus limit the communication between chamber 25 and the atmosphere to any desired size of opening and hence control the venting of chamber 25, and the cylinder 11, in order to allow the table 12 to descend.

An opening 38 is bored into casting 18, below the chamber 23, and is threaded to receive to a correspondingly threaded plug 39 which closes the opening. This plug 39 is provided with a socket 40, in its upper end, the function of which will be explained hereinafter.

The upper end of the casting 18 is provided with a threaded bore 41, extending into the chamber 25. A threaded bushing 42, is inserted in the bore 41, the lower end of which seats in the partition 22. The diameter of the bushing, which is cylindrical in shape, is less than that of the chamber 25, so that an annular space is left around the bushing. A port 43 is provided in the bushing, which allows communication between the hollow interior thereof, and the chamber 25.

The partitions 21 and 22 and the ends of the bushing 42 are provided with openings 44, 45 and 46, through which passes the stem 47 of the main valve 48. This valve has a conical head 49, which cooperates with a conical seat 50 in the partition 21. A compression spring 51, below the valve head, and seated in the socket 40 of the plug 39, urges this valve toward its seat. The valve stem 47, is machined to fit the openings 44, 45, 46, through which it passes so that passage of air around this stem is prevented, and it is provided with two recessed portions 52 and 53, one of which in the upper position of the valve shown in Fig. 3, allows communication between chambers 24 and 25, and the other, in the lower position shown in Fig. 4, allows communication between chambers 23 and 24.

An operating arm 54 is pivoted to the upper end of the casting at 55 and is provided with a bearing portion 56, adapted to rest on the upper end of the stem 47. A relatively slight pressure on the end of the arm 54 will serve to depress the valve 48 against the tension of the spring 51.

The operation of the device is as follows:
The normal position of the controlling valves is shown in Fig. 3. The cylinder is then vented to the atmosphere through the tubing 34, outlet passage 27, outlet chamber 24, vent opening 45, around the recess 52 in the stem, through the interior of the bushing 42, opening 43, vent chamber 25, and vent passage or duct 28, the valve 35 being turned so that the port 36 is in alignment with the passage 28, or to at least permit some flow of air through this passage. The table 13 is then in lowered position as shown in Fig. 1. If it is desired to raise the work table 13, a slight pressure is exerted on the arm 54 by the operator and the valve moved to position shown in Fig. 4. The valve 35 may be turned to closed position at this time. Compressed air is now admitted through the inlet passage 26, chamber 23, around the valve 48 and the recessed portion 53 of the stem into the chamber 24 and through the outlet passage 27 into the cylinder 11. The vent opening 45 is closed by a solid portion of the stem 47 and prevents loss of air even if the valve 35 is left open. When the desired pressure has been exerted on the pattern in the mold on the table 13, the arm 54 is released and the ports again assume their normal position under control of the spring 51, the air below the valve 48 also serving to hold it closed. The speed of descent of the table can then be controlled by the amount of opening of the valve 35.

The casting 18 provides a convenient and satisfactory valve chest which contains all of the parts necessary for the complete control of the supply and venting of air for the raising and lowering of the piston.

It will be understood that my invention is not to be limited to the exact form shown and described in all of its details, but is capable of other embodiments and of modifications which lie within the spirit of the invention, and the scope of the appended claims.

What I claim is:

1. A valve control unit comprising a housing having a chamber, said chamber being provided with inlet and vent ports, a valve stem carrying a valve to control one of said ports and itself controlling the other of said ports and means for actuating the valve.

2. In an air control device, means providing an inlet port and a vent port, a stem member passing through said ports, said stem member being recessed adjacent the vent port to normally allow passage of air therethrough, an unrecessed portion of said stem member closing said port against passage of air upon movement of said member, and a valve on the stem to control the inlet port.

3. In an air control device, air inlet means, air outlet means, means including a valve and valve stem to control communication between said inlet and outlet means, a vent port in communication with said outlet means, said valve stem passing through said vent port.

4. In an air control device, air inlet means, air outlet means, means including a valve and valve stem to control communication between said inlet and outlet means, a vent port in communication with said outlet means, said valve stem passing through said vent port, and being of a size to close said port.

5. In an air control device, air inlet means, air outlet means, means including a valve and valve stem to control communication between said inlet and outlet means, a vent port in communication with said outlet means, said valve stem passing through said vent port, and having a recessed portion adjacent said port to allow passage of air therethrough in a certain position of said stem.

6. In an air control device, air inlet means, air outlet means, a port providing communication between said inlet and outlet means, a vent port in communication with said outlet means, a valve stem passing through the first named port and said vent port, and a valve on said stem to close one of said ports.

7. In an air control device, air inlet means, air outlet means, a port providing communication between said inlet and outlet means, a vent port in communication with said outlet means, a valve stem passing through the first named port and said vent port, and a valve on said stem to close one of said ports, said stem closing the other of said ports.

8. In an air control device, air inlet means, air outlet means, a port providing communication between said inlet and outlet means, a vent port in communication with said outlet means, a valve stem passing through the first named port and said vent port, and a valve on said stem to close one of said ports, said stem being recessed to allow passage of air through the other port when said valved port is closed.

9. In an air control device, air inlet means, air outlet means, a port providing communication between said inlet and outlet means, a vent port in communication with said outlet means, a valve stem passing through the first named port and said vent port, and a valve on said stem to close one of said ports, said stem being recessed to allow passage of air through the other port when said valved port is closed, said port being closed by a solid portion of said stem when said valved port is opened.

10. In an air control device, air inlet means, air outlet means, a port providing communication between said inlet and outlet means, a vent port in communication with said outlet means, a valve stem passing through the first named port and said vent port, and a valve on said stem to close one of said ports, said stem being recessed to allow passage of air through the other port when said valved port is closed, and means to move said valve and stem to different positions.

11. In an air control device, a valve chest including an outlet chamber and a vent chamber, a hollow bushing in said vent chamber, the interior of said bushing communicating with said outlet chamber and said vent chamber and a recessed stem in said bushing to control the communication with said outlet chamber.

12. In a control device, a valve housing provided with an inlet chamber, an outlet chamber, and a vent chamber, a hollow bushing in the vent chamber, the interior of which is in communication with the outlet chamber at one end, the opposite end of the bushing extending through a wall of the housing and a valve stem extending through said bushing and carrying a valve to control communication between the inlet and outlet chambers.

13. In a control device, a valve housing provided with an inlet chamber, an outlet chamber, and a vent chamber, a hollow bushing at the vent chamber, the interior of which is in communication with the outlet chamber at one end, the opposite end of the bushing extending through a wall of the housing, and a valve stem extending through said bushing and carrying a valve to control communication between the inlet and outlet chambers, the end of said valve stem projecting without the housing.

14. In a control device, a valve housing provided with an inlet chamber, an outlet chamber, and a vent chamber, a hollow bushing in the vent chamber, the interior of which is in communication with the outlet chamber at one end, the opposite end of the bushing extending through a wall of the housing, and a valve stem extending through said bushing and carrying a valve to control communication between the inlet and outlet chambers, the end of said valve stem projecting without the housing, and an operating member pivoted to the housing in position to engage the stem.

15. In a control device, a valve housing having an inlet chamber, an outlet chamber communicating therewith, and a vent chamber communicating with the outlet chamber, a spring-pressed valve mounted in the inlet chamber and having a stem passing through the other two chambers and extending without the casing, said valve controlling the communication between the outlet and inlet chambers, and said valve stem itself controlling the communication between the outlet and vent chambers, and means engaging the exposed end of said stem to actuate the valve.

In witness whereof, I have hereunto set my hand, this 17th day of July, 1920.

DANIEL BRANDRIFF.